United States Patent

Pitt et al.

(12)

(10) Patent No.: US 6,472,139 B1
(45) Date of Patent: *Oct. 29, 2002

(54) NONIONIC SURFACE ACTIVE OLIGOMERS AS COATING AIDS FOR THE MANUFACTURE OF PHOTOGRAPHIC PRODUCTS

(75) Inventors: Alan R. Pitt, Sandridge; Trevor J. Wear, South Harrow; Elizabeth A. Simister, Harrow, all of (GB); Alice G. Moon, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/776,107

(22) Filed: Feb. 2, 2001

(30) Foreign Application Priority Data

Feb. 5, 2000 (GB) .............................. 0002627

(51) Int. Cl.$^7$ ................................. G03C 1/38
(52) U.S. Cl. ................. 430/635; 430/619; 430/631
(58) Field of Search ................. 430/619, 631, 430/635

(56) References Cited

U.S. PATENT DOCUMENTS

| 3,057,724 | A | | 10/1962 | Lovett et al. | |
| 5,364,733 | A | * | 11/1994 | Kenney et al. | 430/203 |
| 5,366,857 | A | | 11/1994 | Pitt et al. | |
| 5,474,889 | A | | 12/1995 | Pitt et al. | |
| 2001/0031146 | A1 | * | 10/2001 | Lelental et al. | 430/619 |

FOREIGN PATENT DOCUMENTS

| DE | 25 58 591 A | 10/1962 |
| EP | 0000337 | 1/1979 |
| FR | 2575486 | 7/1986 |
| FR | 2 614 786 | 11/1988 |

OTHER PUBLICATIONS

Research Disclosure, Dec. 1978, Item 17643.
Research Disclosure, Dec. 1989, Item 308119.
Pavia et al., Makromol Chem., New perfluoroalkyl telomeric non–ionic surfactants: synthesis, physicochemical and biological properties, 1992, 193(9), pp. 2505–2517.

* cited by examiner

Primary Examiner—Janet Baxter
Assistant Examiner—Amanda C. Walke
(74) Attorney, Agent, or Firm—Doreen M. Wells

(57) ABSTRACT

A hydrophobically capped oligomeric acrylamide or pyrrolidone is employed as a coating aid in coating compositions, especially such compositions useful in the manufacture of photographic products. Preferred coating aids are surfactants having the general formula R—L—T    or    (1)

R$^1$—L—T
   |
   R$^2$                              (2)

in which

R, R$^1$ and R$^2$ are each independently selected from aliphatic hydrocarbyl, aryl-(aliphatic hydrocarbyl) and (aliphatic hydrocarbyl)-aryl groups, which groups may be unsubstituted, partially fluorinated or fully fluorinated, L is a sulphur atom or a linking group that contains a sulphur atom attached to the T group and T is a hydrophilic oligomeric group obtainable by the oligomerisation of one or more vinyl monomers having an amido function.

25 Claims, No Drawings

NONIONIC SURFACE ACTIVE OLIGOMERS AS COATING AIDS FOR THE MANUFACTURE OF PHOTOGRAPHIC PRODUCTS

FIELD OF THE INVENTION

The present invention relates to certain nonionic oligomeric surfactants, in particular such surfactants based on vinyl systems having an amido function, especially acrylamide, methacrylamide or a derivative of either of these, and to their use as coating aids, especially for use in the manufacture of aqueous coated photographic products.

BACKGROUND OF THE INVENTION

Coating aids facilitate the coating process. For example, coating aids are used in the manufacture of photographic products, such as photographic films and the like, for controlling coating uniformity after the application of the coated layers onto a product support (such as film or paper), for the period the coating remains fluid. After the coating point, the coated layers pass through a chill box. During their passage through this section the coated layers set to a rigid gel. Hence, the coated layers remain fluid from their application point to a position somewhere inside the chill box section. This period of fluidity amounts to a period of seconds at current coating speeds. During this period, the coating is subject to the impact of disturbances or perturbations which result from vibrations or air currents, present as part of the mechanics of the coating process.

Amongst commonly known coating aids, saponin is unusual insofar as it provides control of post-coating flow over a wide range of concentrations. However, in the multilayer coating of colour photographic products, it is typical for the lower layers to possess dynamic surface tensions <35 mN.m$^{-1}$ due to the surface activity of the dispersing aids used therein, e.g. dispersants for colour couplers such as Alkanol XC™ (DuPont) which leads to surface tension values in the range 32–35 mN.m$^{-1}$. To remain spread, the uppermost layer needs to possess a lower surface tension than any of the underlying layers. Unfortunately, saponin is not very effective at lowering surface tension insofar as its limiting surface tension in aqueous gelatin solution is about 38 mN.m$^{-1}$. Hence it is clear, that in such cases, saponin cannot be used in isolation in the uppermost layer to improve coating uniformity, for if it is used, coating quality becomes unacceptable due to retraction of the top layer over the underlying ones. Furthermore, this deficiency cannot be overcome by using saponin in combination with a more surface-active regular coating aid, like Aerosol OT™ (Cytec), as such materials cause substantive increases in the susceptibility of the coating to disturbances due to vibrations or air currents. Therefore, the ability to manipulate surface tension to values <35 mN.m$^{-1}$ whilst maintaining good coating uniformity would be of substantial benefit in simultaneous multi-layer coating where the relative dynamic surface tensions between layers is critical as described above.

It is well known in the art that gelatin coatings show a tendency to become electrostatically charged on separation from surfaces that they come into contact with, such as transport rollers. The nature of the electrostatic charging depends on the relative triboelectric properties of the two contacting surfaces and the conditions prevailing at the time of the charging, such as: speed of contact and separation processes; pressure of contact; temperature; relative humidity; and so on. It is also well known in the art that gelatin-based coatings containing fluorocarbon surfactants often tend to charge electrically in the opposite direction to those containing hydrocarbon-based surfactants. Hence it is common practice to coat mixtures of fluorocarbon and hydrocarbon surfactants in the uppermost layers of photographic products in order to minimise the electrostatic charging from a triboelectric point of view.

SUMMARY OF THE INVENTION

The present invention, in one of its aspects, provides hydrophobically capped oligomeric acrylamides or pyrrolidones, in particular the compounds of the general formula

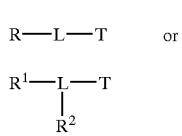

in which

R, R$^1$ and R$^2$ are hydrophobic groups, in particular are each independently selected from aliphatic hydrocarbyl, aryl-(aliphatic hydrocarbyl) and (aliphatic hydrocarbyl)-aryl groups, which groups may be unsubstituted, partially fluorinated or fully fluorinated, L is a sulphur atom or a linking group that contains a sulphur atom that is attached to the T group, and T is a hydrophilic oligomeric group obtained by the oligomerisation of one or more vinyl monomers having an anido function.

The present invention also provides, in a further aspect thereof, a coating composition that comprises a liquid medium that contains a hydrophilic colloid and a surfactant, wherein the said surfactant is a compound of the present invention as defined above.

The present invention, in another aspect, provides a method of coating a substrate, which comprises applying to the substrate a coating composition of the present invention. The invention also extends to the coated substrates so produced, especially such coated substrates that may be used in or as photographic products, such as photographic films.

The present invention, in yet another aspect thereof, provides the use of a compound of the present invention, as defined above, as a coating aid in a liquid coating composition.

DESCRIPTION OF EXEMPLARY EMBODIMENTS

The preferred compounds of the present invention are defined by either of the following formulae:

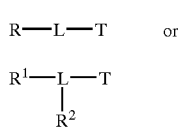

The number of hydrophobic groups, R or (R$^1$+R$^2$), depends on the linking group L. The hydrophobic group or groups each comprise an aliphatic hydrocarbyl, aryl-(aliphatic hydrocarbyl) or (aliphatic hydrocarbyl)-aryl group, wherein, in each case, the aliphatic hydrocarbyl group may be saturated or unsaturated and may be straight or branched. These groups may be non-fluorinated, completely fluorinated or partially fluorinated. Preferred aliphatic hydrocarbyl groups are alkyl and alkenyl groups and preferred aryl moieties are phenyl and naphthyl groups. Typically, each of the groups R, $R^1$ and $R^2$ contains from 8 to 21 carbon atoms. In certain preferred embodiments $R^1$ and $R^2$ together have a total of from 8 to 21 carbon atoms. $R^1$ and $R^2$ may be the same or different.

The linking entity L is either a sulphur atom (—S—) or a linking group that contains a sulphur atom through which it is attached to T, in other words a linking group that is linked to the or each hydrophobic group by a simple chemical bond and to the oligomeric moiety T by a thio-link (—S—).

Certain preferred sub-groups of the present compounds are represented by the following general formulae, in which formulae (3), (4) and (5) contain typical linking groups for compounds with one hydrophobic group and formulae (6), (7) and (8) contain typical linking groups for compounds with two hydrophobic groups:

R—S—T                     (3)

R—O—OC—CH$_2$—S—T          (4)

R—NH—OC—CH$_2$—S—T         (5)

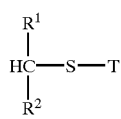        (6)

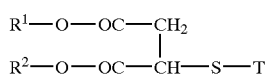        (7)

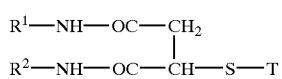        (8)

In the above formulae (4), (5), (7) and (8), other simple chemical groups, in place of the ester or amide link, may also come into consideration.

The oligomeric group T is preferably based on the oligomerisation of vinyl monomers with an amido function, the vinyl part providing a route to oligomerisation and the amido part providing a nonionic polar group to constitute the hydrophilic functional group (after oligomerisation). The oligomeric group T can be constituted from a single monomer source or a mixture of two or more monomers, provided that the resultant oligomeric chain is sufficiently hydrophilic to render the resulting surface-active material soluble in water or other medium. A mixture of monomers may give rise to a group T that is a random co-oligomer. Preferred monomers used to make the oligomeric chain T are acrylamide and derivatives of acrylamide, although methacrylamide and derivatives of methacrylamide can be used too. The monomer 2-vinylpyrrolidone may also be used, although it is less favoured owing to the possibility of adverse photographic effects sometimes found with polyvinyl pyrrolidone (PVP) materials.

Certain suitable monomers can be represented by the two general formulae

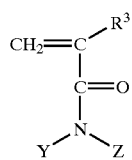        (9)

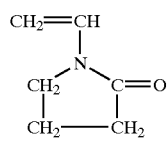        (10)

wherein formula (9) represents acrylamide, methacrylamide or a derivative of either of these, and formula (10) represents 2-vinylpyrrolidone (also abbreviated to Py hereinafter). In formula (9), $R^3$ is H or a $C_1$, $C_2$ or $C_3$ alkyl group, preferably H or $CH_3$ (which leads to an acrylamide or methacrylamide-based monomer, respectively) and Y and Z, which may be the same or different, are each H, $C_1$–$C_3$ alkyl or $C_1$–$C_4$ alkyl substituted with one or more hydroxyl groups, preferably H, $CH_3$, $C_2H_5$ or $C(CH_2OH)_3$. Alternatively, Y and Z, together with the N atom to which they are shown attached, may form a heterocyclic ring, in particular a 5- or 6-membered ring, e.g. a pyrrolidinyl or piperidinyl ring.

In certain preferred embodiments, the compounds of the formulae (1) and (2) have an oligomeric group (T) that contains from 2 to 100, more preferably from 3 to 50, and typically from 5 to 40, monomeric units. The degree of oligomerisation is generally selected so as to provide sufficient hydrophilicity to render the resulting compound soluble in the aqueous medium.

The hydrophobically capped oligomeric acrylamide or pyrrolidone dispersants useful in the present invention may be prepared by processes similar to those described in the preparative Examples hereinafter and in Pavia et al, Makromol. Chem. (1992), 193 (9), 2505–2517.

Exemplary compounds of the present invention are described in the following Table A. Each compound therein is allocated a reference number (I-1, I-2, etc.) by which it is identified in the Test Examples hereinafter.

TABLE A

SAMPLE MATERIALS OF THE INVENTION

| | | |
|---|---|---|
| $C_6F_{13}CH_2CH_2S[A]_5H$ | I-1 | A = acrylamide where $R^3$ = Y = Z = H |
| $C_8F_{17}CH_2CH_2S[A]_{13}H$ | I-2 | |
| $C_8F_{17}CH_2CH_2S[A]_{10}H$ | I-3 | |
| $C_8F_{17}CH_2CH_2S[A]_7H$ | I-4 | |
| $C_6F_{13}CH_2CH_2S[A]_4H$ | I-5 | |
| $C_{12}H_{25}S[A]_{10}H$ | I-6 | |
| $C_6F_{13}CH_2CH_2O.OC.CH_2S[A]_5H$ | I-7 | |

TABLE A-continued

SAMPLE MATERIALS OF THE INVENTION

| Compound | ID | Notes |
|---|---|---|
| $C_8H_{17}O.OC.CH_2$<br>        |<br>$C_8H_{17}O.OC.CHS[A]_{15}H$ | I-8 | |
| $(CH_3)_2CH(CH_2)_3CH(CH_3)(CH_2)_2O.OC.CH_2$<br>        |<br>$(CH_3)_2CH(CH_2)_3CH(CH_3)(CH_2)_2O.OC.CHS[A]_{15}H$ | I-9 | |
| $C_6F_{13}CH_2CH_2S[X]_5H$ | I-10 | X is N,N-dimethylacrylamide where $R^3 = H$, and $Y = Z = CH_3$ |
| $C_6F_{13}CH_2CH_2S[X]_7H$ | I-11 | |
| $C_6F_{13}CH_2CH_2S[X]_{10}H$ | I-12 | |
| $C_4F_9CH_2CH_2O.OC.CH_2$<br>        |<br>$C_4F_9CH_2CH_2O.OC.CHS[X]_7H$ | I-13 | |
| $C_4H_9.CH(C_2H_5).CH_2O.OC.CH_2$<br>        |<br>$C_4H_9.CH(C_2H_5).CH_2O.OC.CHS[X]_{10}H$ | I-14 | |
| $C_4H_9.CH(C_2H_5).CH_2O.OC.CH_2$<br>        |<br>$C_4H_9.CH(C_2H_5).CH_2O.OC.CHS[X]_{15}H$ | I-15 | |
| $(CH_3)_2CH(CH_2)_3CH(CH_3)(CH_2)_2O.OC.CH_2$<br>        |<br>$(CH_3)_2CH(CH_2)_3CH(CH_3)(CH_2)_2O.OC.CHS[X]_{15}H$ | I-16 | |
| $C_6F_{13}CH_2CH_2S[Oh]_5H$ | I-17 | Oh is where $R^3 = Y = H$ and $Z = C(CH_2OH)_3$ |
| $C_8F_{17}CH_2CH_2S[Oh]_7H$ | I-18 | |
| $C_8F_{17}CH_2CH_2S[Oh]_5H$ | I-19 | |
| $C_6F_{13}CH_2CH_2S[Py]_{10}H$ | I-20 | "Py" is 2-vinyl pyrrolidone |
| $C_6F_{13}CH_2CH_2S[A_3 + X_3]H$ | I-21 | (random co-polymer) |
| $C_6F_{13}CH_2CH_2S[A_5 + X_2]H$ | I-22 | (random co-polymer) |
| $C_{12}H_{25}S[X]_{10}H$ | I-23 | |
| $C_{16}H_{33}S[Oh]_{15}H$ | I-24 | |

As indicated above, the compounds of the present invention are surface-active agents that find use as coating aids. In certain preferred embodiments, a coating composition comprises an aqueous solution of a hydrophilic colloid and a compound of the present invention present as a coating aid. In certain other preferred embodiments, a product, e.g. a photographic material, comprises one or more layers coated on a support, each such layer comprising or consisting of a hydrophilic colloid composition; such a product may be made by coating the support with one or more layers, each comprising or consisting of a hydrophilic colloid coating composition, and drying the layer or layers, wherein at least one of the layers is a coating composition according to this invention. The drying of the layer(s) may be preceded by the chill setting of the coated colloid layers. In certain particularly preferred embodiments, a photographic material comprises a support and at least one hydrophilic colloid layer and at least one light-sensitive silver halide emulsion layer, at least one hydrophilic colloid layer comprising a compound according to the present invention. It is generally preferred to coat the aqueous hydrophilic colloid layers onto a support simultaneously. The compounds of the invention are particularly useful as coating aids when incorporated in the outermost or topmost layer, e.g. a protective overcoat, of a photographic material; however, the use of the compounds in underlying layers is not precluded.

The types of layers that may be included in a photographic material and suitable components for use in photographic products are known in the art and include those which are mentioned, for example, in Research Disclosure, December 1978, Item 17643, and in U.S. Pat. No. 5,366,857 and U.S. Pat. No. 5,474,889, as are procedures whereby the coating and drying of the hydrophilic colloid layers may be carried out. Components for use in photographic products are also disclosed in Research Disclosure, December 1989, Item 308119, published by Kenneth Mason Publications Ltd. The disclosure in each of the aforesaid publications is incorporated herein by reference.

The preferred hydrophilic colloid is gelatin, e.g. alkali-treated gelatin, acid-treated gelatin, deionized gelatin or a gelatin derivative such as acetylated or phthalated gelatin. Other hydrophilic colloids, however, may come into consideration, for example naturally occurring substances such as proteins, protein derivatives, cellulose derivatives (e.g. cellulose esters), polysaccharides (e.g. dextran, gum arabic, zein, casein or pectin), collagen derivatives, agar-agar, arrowroot or albumin, or synthetic hydrophilic colloids such as polyvinyl alcohol, acrylamide polymers, maleic acid copolymers, acrylic acid copolymers, methacrylic acid copolymers or polyalkylene oxides.

The present compounds will usually be employed in the coating compositions at a concentration of from 0.01 to 1.5 percent by weight, typically from 0.02 to 1 percent by weight.

The use of coating aids, to control uniformity after application and prior to setting in the chill box, has been mentioned. The materials of the invention offer the advantage that they provide better uniformity in that context than most simple coating aids. Furthermore, they offer the additional advantage that the improved coating uniformity is attained independently of their concentration over a wide range. In contrast, coating uniformity becomes progressively worse with increasing concentration with most simple coating aids.

The desirability of producing surface tension values of less than 35 mN.m$^{-1}$ whilst maintaining good coating uniformity has also been mentioned. In this context, the materials of the invention possess a major advantage over saponin, the advantage being that their chemical structure can be easily modified to provide more effective lowering of surface tension. In contrast, saponin, being a natural product (source: extracted from soapbark), is not capable of significant variation. An example of the way in which the materials of the invention can be modified in a beneficial way is to change the hydrophobic tail portion of their structure to one with a perfluorocarbon tip; this provides the capability for surface tension reduction to values <20 mN.m$^{-1}$, i.e. significantly <35 mN.m$^{-1}$. The dynamics of adsorption is also dependent on chemical structure and hence can be modified accordingly and systematically; this is plainly of importance to a dynamic process such as coating.

Mention was also made of using a mixture of fluorocarbon surfactant and hydrocarbon surfactant to reduce triboelectric charging. This is attainable with the materials of the invention since hydrocarbon and fluorocarbon versions can be used as mixtures without destroying their ability to promote good coating uniformity. With saponin there is no parallel situation, owing to the absence of a fluorinated version of saponin: if saponin is used in mixtures with other simple fluorosurfactants the latter will destroy its above-described coating uniformity properties. In fact, one good option for coating per se is the combination of a fluorocarbon embodiment of the invention with saponin as a hydrocarbon-based co-surfactant.

The present invention is illustrated in and by the following Examples

PREPARATIVE EXAMPLES

Examples of the synthesis of the oligomeric surfactants of the invention are described below. The method for oligomerisation was adapted from the preparation described by Pavia et al in Makromoleculare Chemie, (1992), 193(9), 2505–17.

Example 1
Synthesis of Oligomer I-1

1H,IH,2H,2H-Tridecafluorooct-1-yl thiol (38.1 g, 0.10 mol) and acrylamide (71.1 g, 1.00 mol) were dissolved in methanol (500 ml) and degassed with argon for 20 minutes. 2,2'-Azo-bis(2-methylpropionitrile)[AIBN] (2.0 g) was added and the solution stirred and heated to reflux under argon for 4 hours. A thick white precipitate began to form after approximately 1 hour. On cooling the mixture was filtered and the solid dried in vacuo to give a white powder (80.1 g, 73%). Analysis was consistent with the oligomer I-1.

Example 2
Synthesis of Oligomer I-6

Acrylamide (35.50 g, 0.50 moles) and 1-dodecanethiol (10.10 g, 0.050 moles) were suspended in ethanol (250 ml) under nitrogen atmosphere in a 1L three-necked round bottomed flask equipped with a reflux condenser. The solution was stirred and degassed with nitrogen for 20 minutes. Stirring was continued and the temperature raised to 70° C. over a period of 20 minutes during which time the reagents dissolved. AIBN (1.00 g, 6.10 mmoles) was added to the stirred solution at 70° C. and heating continued for 4 hours under the control of an automated reactor system. During this time a white suspension formed. After cooling, the resulting white precipitate was filtered under suction and dried in vacuo to give a white powder (39.6 g, 87%). Analysis of this product was consistent with the desired oligomeric acrylamide.

Example 3
Synthesis of Oligomer I-7

Tridecafluorooctanol (36.41 g, 0.10 mol) and mercaptoacetic acid (9.21 g, 0.10 mol) were refluxed for 17 hours under an argon atmosphere in toluene (200 ml)in the presence of p-toluene sulphonic acid hydrate (0.35 g) in a flask equipped with a Dean & Stark trap. During this time approximately 2 ml of water collected in the side arm of the trap. Thin layer chromatography eluting with ethyl acetate showed product of Rf 0.78 (compared to alcohol Rf 0.42). Toluene was removed under reduced pressure and the crude product re-dissolved in ethyl acetate (450 ml). The solution was washed with aqueous saturated sodium hydrogen carbonate (2×200 ml) and the organic layer dried over anhydrous magnesium sulphate, filtered and evaporated under reduced pressure to give a clear oil (40.2 g, 92%). Analysis was consistent with tridecafluorooctyl mercaptoacetate.

Tridecafluorooctyl mercaptoacetate (5.16 g, 0.012 mol), acrylamide (4.18 g, 059 mol) and AIBN (0.055 g) were dissolved in methanol (50 ml) and argon bubbled rough the solution for 20 minutes to degas. The solution was then refluxed under an argon atmosphere for 1 hour during which time a white precipitate had formed. The white solid was filtered and dried in vacuo (4.1 g, 43%).

Example 4
Synthesis of oligomer I-13

1H,1H,2H,2H-perfluorohexan-1-ol (5.60 g, 0.021 mol) and mercaptosuccinic acid (1.51 g, 0.01 mol) were refluxed together in toluene (200 ml) in the presence of p-toluene sulphonic acid hydrate (0.075 g, catalytic amount) in a three-necked round-bottomed flask quipped with a Dean & Stark trap under argon for 24 hours. During this time approximately 3.6 ml of water collected in the side arm and the suspension changed to a clear solution. The solvent was evaporated at reduced pressure to give a colourless oil. The crude oil was re-dissolved in ethyl acetate (300 ml) and washed with saturated aqueous sodium hydrogen carbonate (200 ml). The organic layer was then separated and dried over anhydrous magnesium sulphate, filtered and evaporated to give a clear oil (5.58 g, 87%). Analysis was consistent with the 1 H, 1 H,2H,2H-perfluorohex- 1-yl mercaptosuccinate.

Di-nonafluorohexylmercaptosuccinate (3.30 g, 0.0050 mol) and N,N-dimethylacrylamide (3.70 g, 0.037 mol) were dissolved in methanol (50 ml). AIBN (0.10g) was added as catalyst and the mixture stirred and degassed with argon for 20 minutes. The solution was refluxed under an argon atmosphere for 18 hours then cooled and washed with heptane (2×150 ml). The methanol layer was evaporated to give a clear, gummy solid (4.8 g). The crude product was dissolved in water and the water-insoluble by-products separated. The aqueous solution was freeze dried to give a clear, sticky semi-solid (4.2 g, 63%). Analysis was consistent with the desired oligomer 1–13.

Example 5

Synthesis of I-15

Mercaptosuccinic acid (15.10 g, 0.10 moles) and 2-ethyl-1-hexanol (26.30 g, 0.20 moles) were suspended in toluene (200 ml) in a 500 ml round bottomed flask. Toluene sulphonic acid hydrate (0.10 g) was added as catalyst and the flask set up for reflux with a Dean & Stark trap. The components went into solution as the mixture was warmed and the whole was refluxed under an argon atmosphere for 18 hours. The reaction mixture was concentrated by evaporation under reduced pressure then re-dissolved in ethyl acetate (500 ml) and washed sequentially with saturated aqueous sodium hydrogen carbonate (300 ml) and water (300 ml). The organic layer was separated, dried over anhydrous magnesium sulphate, filtered and evaporated to give a pale yellow oil (31.1 g, 83%). Analysis was consistent with di-(2-ethyl-1-hexyl)mercaptosuccinate.

Di-(2-ethyl1-hexyl)mercaptosuccinate (24.60 g, 0.066 moles) and N,N-dimethylacrylamide (97.65 g, 0.985 moles) were dissolved in methanol (260 ml) in a three necked 500 ml flask. The solution was stirred and degassed by bubbling argon through the solution for 20 minutes. AIBN (0.70 g) was added and the solution heated to reflux for 17 hours under argon atmosphere. A sample was analysed by electrospray mass spectrometry and found to contain product. The methanolic solution was diluted with methanol and then washed with heptane. The methanol layer was re-evaporated to give a deep yellow/brown viscous oil which solidified on cooling (123.0 g, 100%).

Example 6

The preparation of other oligomeric species was performed using procedures similar to those described above. Where no precipitate formed the alcoholic solution was washed with heptane to remove excessively hydrophobic by-products as described in Example 5.

Test Examples

The advantages of the present compounds as coating aids are illustrated in the Test Examples that follow.

Example 7

Coating Uniformity

As mentioned above, the compounds of the invention possess advantages over many commonly known coating aids in that as they are more effective at controlling coating uniformity after the application of the coated layers onto a product support (such as film or paper). The method by which this aspect of coating uniformity is assessed is described in the following section.

Measurement of Coating Uniformity in Terms of Severity of Mottle

In this test coating uniformity is measured before and after an applied air disturbance in order to determine the beneficial effects of surfactants in the top layer of a three-layer gelatin coating. In the following examples, an overcoat layer is applied simultaneously with two other layers using conventional multilayer bead coating methods. The first layer is a 4% gelatin solution coated at a wet coverage of 73 g.m$^{-2}$. The second layer is a 10% gel solution coated at a wet coverage of 16.25 g.m$^{-2}$ with carbon slurry added to enhance measurement of coating thickness uniformity. The final layer is 11.2% gel coated at a wet coverage of 9.7 g.m$^{-2}$ with surfactant added as given in the specific examples below. The three layers are coated simultaneously at 61 m.min$^{-1}$ onto a transparent polyethylene terephthalate film support containing a gelatin subbing layer.

The coated support is then conveyed through a chilled compartment where perforated metal plates are used to introduce an air disturbance over the coating prior to chill setting of the gelatin layers. Calibrated mottle detectors are placed before and after the applied air disturbance to measure optical density, an indication here of the layer thickness. Optical density is recorded over 20 seconds for each sample and the variance of optical density with time is calculated from the power spectrum before and after the disturbance. In order to separate out the applied disturbance from any other coating disturbance prior to the chill section, the variance prior to the disturbance ("in") is subtracted from the variance after the disturbance ("out") over the frequency range of interest (20–80 Hz). This frequency range represents mottle (a random blotchy coating pattern) on the order of 1.25 to 5 cm in wavelength. The square root of the difference between the exiting variance and entering variance in the 20 to 80 Hz band, "band power" in the examples below, is the uniformity measure of interest for comparison of surfactant behaviour. A higher band power value indicates a less uniform coating. In the few cases where the variance after the applied air disturbance was less than the coating noise (out <in), a value of zero was assigned to the band power.

Results of Mottle Measurements

Tables 1 and 2 show the severity of mottle (measured as "band power"—higher is worse) obtained using example materials of the invention; i.e. acrylamide and N,N-dimethyl-acrylamides, respectively.

TABLE 1

Severity of mottle as function of coating aid concentration-acrylamides
Band Power (out-in) as a Measure of the Severity of Mottle
Materials of the Invention

| I-1 | | I-2 | | I-6 | | 50/50 mixture: I-1/I-6 | |
| --- | --- | --- | --- | --- | --- | --- | --- |
| Conc % | Band Power | Conc % | Band Power | Conc % | Band Power | Conc % | Band Power |
| 0.030 | 0.10 | 0.060 | 0.14 | 0.060 | 0.28 | 0.060 | 0.23 |
| 0.050 | 0.00 | 0.080 | 0.09 | 0.080 | 0.24 | 0.080 | 0.20 |
| 0.060 | 0.00 | 0.100 | 0.00 | 0.100 | 0.19 | 0.100 | 0.16 |
| 0.100 | 0.14 | 0.150 | 0.08 | 0.150 | 0.18 | 0.150 | 0.20 |
| 0.120 | 0.16 | 0.200 | 0.09 | 0.200 | 0.21 | 0.200 | 0.16 |
| 0.160 | 0.13 | 0.250 | 0.10 | 0.250 | 0.20 | 0.250 | 0.15 |
| 0.200 | 0.14 | 0.300 | 0.10 | 0.300 | 0.21 | 0.300 | 0.16 |
| 0.300 | 0.17 | 0.400 | 0.09 | 0.400 | 0.22 | 0.400 | 0.16 |
| 0.400 | 0.15 | | | | | | |
| 0.500 | 0.15 | | | | | | |
| 0.600 | 0.19 | | | | | | |
| 0.800 | 0.18 | | | | | | |

TABLE 2

Severity of mottle as function of coating aid concentration — N,N-dimethylacrylamides Band Power (out-in) as a Measure of the Severity of Mottle
Materials of the Invention

| I-11 | | I-12 | |
| --- | --- | --- | --- |
| Conc % | Band Power | Conc % | Band Power |
| 0.06 | 0.0 | 0.12 | 0.20 |
| 0.08 | 0.14 | 0.20 | 0.21 |
| 0.10 | 0.0 | 0.30 | 0.21 |
| 0.20 | 0.0 | 0.40 | 0.11 |
| 0.30 | 0.0 | | |
| 0.40 | 0.0 | | |

Table 3 shows the severity of mottle (measured as "band power"—higher is worse) obtained using a number of common coating aids over a range of concentration. These materials, Triton-X200™ (TX200), Aerosol TO™ (AOT), Alkanol XC™ (AXC), and Olin 10G™ (10G), are used for comparison against the compounds of the invention.

TABLE 3

Severity of mottle as function of coating aid concentration-comparison materials
Band Power as a Measure of the Severity of Mottle Comparison Materials

| TX200 | | AOT | | AXC | | 10G | |
|---|---|---|---|---|---|---|---|
| Conc % | Band Power | Conc % | Band Power | Conc % | Band Power | Conc % | Band Power |
| 0.020 | 0.58 | 0.025 | 0.74 | 0.030 | 0.52 | 0.050 | 0.28 |
| 0.030 | 0.63 | 0.035 | 0.70 | 0.050 | 0.65 | 0.150 | 0.28 |
| 0.040 | 0.68 | 0.075 | 0.83 | 0.075 | 0.76 | 0.250 | 0.66 |
| 0.050 | 0.77 | 0.100 | 0.85 | 0.125 | 0.86 | 0.300 | 0.80 |
| 0.075 | 0.99 | 0.125 | 0.87 | 0.150 | 0.90 | 0.400 | 0.91 |
| 0.100 | 1.16 | 0.150 | 1.19 | | | | |
| 0.125 | 1.22 | 0.200 | 1.48 | | | | |
| 0.150 | 1.24 | | | | | | |
| 0.200 | 1.32 | | | | | | |

The data in Tables 1, 2 and 3 show that the compounds of the invention produce better coating uniformity during the period of postcoating flow relative to common coating aids such as those listed in Table 3. The materials of the invention fulfil this role independently of their concentration over a relatively wide range; generally speaking, their severity of mottle is <0.25 "band power" over most of their concentration range, from 0.05–0.4 wt % in the coating melt. In contrast, the common coating aids listed in Table 3 exhibit a severity of mottle that is >0.25 "band power", which becomes increasingly worse with increasing concentration. On increasing concentration from zero wt %, all four comparison compounds show a severity of mottle $\geq 0.9$ "band power" before reaching a concentration of 0.4 wt % in the coating melt; in fact, in three of the cases this condition is attained at or before a concentration of 0.15 wt % in the melt.

In summary, the advantages displayed by the coating aids of the invention are:

1. Better coating uniformity (as defined by "bandpower"); and
2. A coating uniformity that is invariant with the concentration of the coating aid over a wide range.

Table 4 shows data relating to the severity of mottle obtained with the coating aid saponin (SAP) when used under the test conditions. These data demonstrate that the saponin equals the performance of the coating aids of the invention, both in terms of coating uniformity and in terms of invariant performance with increasing concentration.

TABLE 4

Severity of mottle as function of coating aid concentration — saponin

Band Power (out-in) as a Measure of the Severity of Mottle

| SAP | | SAP + 0.08 wt % TX 200 | |
|---|---|---|---|
| Conc % | Band Power | SAP Conc % | Band Power |
| 0.040 | 0.15 | 0.06 | 1.2 |
| 0.060 | 0.15 | 0.08 | 1.1 |
| 0.080 | 0.14 | 0.10 | 1.0 |
| 0.150 | 0.15 | 0.15 | 1.0 |
| 0.200 | 0.13 | 0.25 | 1.0 |
| 0.300 | 0.13 | 0.40 | 1.0 |
| 0.400 | 0.13 | | |

Although saponin is capable of equalling the coating uniformity attained by the coating aids of the invention, it is incapable of lowering surface tension below 38 $mN.m^{-1}$ which is above that of typical underlying layers in colour photographic products. These underlying layers often possess surface tensions <35 $mN.m^{-1}$. Hence saponin is usually not suitable for use in isolation as a coating aid in the top layer of a multi-layer coating pack. Underlying layers of lower surface tension would cause edge retraction and layer inversions of the top layer thus rendering the coating non-uniform and therefore unfit for its purpose.

Common coating aids can be added to saponin to lower the surface tension to an acceptable value, but this addition appears to "undo" the action of saponin and the severity of mottle increases dramatically. The second set of data in Table 4 shows that by mixing a common coating aid such as Triton X200™ (TX200) with saponin, the severity of mottle increases by more than six fold in "band power" terms. In other words, if a common coating aid is used in conjunction with saponin, it prevents the saponin from achieving the good coating uniformity that saponin would normally achieve when used in isolation.

Example 8
Lower Limiting Values of Surface Tension

The compounds of the invention show the advantage over saponin that their chemical structure can be varied to obtain lower limiting values of surface tension without destroying their coating uniformity properties. Table 5 shows that values <35 $mN.m^{-1}$ are readily attainable and that therefore the materials of the invention can be designed to accommodate the surface tension requirements of the top layer of a typical multi-layer photographic coating where the surface tensions of the underlying layers often lie below 35 $mN.m^{-1}$. The exact value depends on the surface active materials used in the underlying layers such as the dispersants used for emulsifying colour couplers. For a dispersant such as Alkanol XC™, the surface tension typically lies in the range 32–35 $mNm.^{-1}$, though this will depend significantly on other ingredients in the composition.

TABLE 5

Illustration of low surface tension values achievable using compounds of the invention

| | Surface Tension in Aqueous Solution containing 7% Deionized Type IV Gelatin | | |
|---|---|---|---|
| Coating Aid (Invention) | Concentration of Coating Aid 0.1 wt % | Concentration of Coating Aid 0.3 wt % | Concentration of Coating Aid 1.0 wt % |
| I-1 | 16 | 27 | — |
| I-2 | 20 | 20 | 20 |
| I-3 | 29 | 27 | — |
| I-4 | 27 | 25 | — |
| I-5 | 18 | 18 | — |
| I-7 | 17 | 17 | 17 |
| I-8 | — | 31 | 31 |
| I-9 | 26 | 24 | — |
| I-10 | 22 | 22 | — |
| I-11 | 21 | 17 | 17 |
| I-12 | 26 | 25 | 25 |
| I-13 | 21 | 18 | 18 |
| I-14 | 27 | 27 | — |
| I-15 | 29 | 28 | 29 |
| I-16 | 26 | 25 | — |
| I-17 | 33 | 27 | 28 |
| I-18 | 32 | 30 | 31 |
| I-19 | 33 | 31 | 30 |
| I-20 | — | 34 | 22 |

TABLE 5-continued

Illustration of low surface tension values achievable using compounds of the invention

| Coating Aid (Invention) | Surface Tension in Aqueous Solution containing 7% Deionized Type IV Gelatin | | |
|---|---|---|---|
| | Concentration of Coating Aid 0.1 wt % | Concentration of Coating Aid 0.3 wt % | Concentration of Coating Aid 1.0 wt % |
| I-21 | 16 | 15 | 16 |
| I-22 | 15 | 15 | 16 |

In summary, Table 5 demonstrates that surface tensions of the materials of the invention can be made relatively low by manipulation of their chemical structure. This is mainly achieved by using fluorocarbon hydrophobic tails or di-tail hydrocarbons systems; in the latter case branching of the tails tends to lead to even lower surface tension values. The desired surface tensions for coating are attained (<35 mN.m$^{-1}$) without destroying the coating uniformity properties of the coating aid. This is not the case with saponin which cannot meet the surface tension requirement for an upper layer in a typical multi-layer coating where surface tensions of underlying layers are significantly below that attained by saponin itself. Although other coating aids can be added to saponin to lower surface tension to acceptable values, this action, as indicated above, usually destroys the quality of coating uniformity normally attained by the saponin during post-coating flow.

Example 9
Surface Electrical Resistivity and Inpact Electrostatic Charging of Gelatin-based Coatings As mentioned already, it is well known in the art that gelatin-based coatings containing fluorocarbon surfactants often tend to charge electrically in the opposite direction to those containing hydrocarbon-based surfactants. Hence it is common practice to coat mixtures of fluorocarbon and hydrocarbon surfactants in the uppermost layers of photographic products to minimise the electrostatic charging due to a triboelectric mechanism. This is possible with the materials of the invention owing to the simple fact that both fluorocarbon and hydrocarbon versions exist, whereas there is no fluorinated option with saponin. The addition of other surfactants to saponin to modify its triboelectric performance is not an option since, as already explained, their addition to saponin tends to destroy its coating performance.

One way of comparing the electrostatic performance of the materials of the invention in coatings is to make impact charge measurements against a standard surface under standard conditions, using a technique pioneered by W. J. Bailey (U.S. Pat. No. 3,501,653). This technique measures the charge on a coating after a standard impact against a circular stainless steel electrode at 21° C. and 50% relative humidity (RH). To characterise the electrostatic charging characteristics of the materials, the following protocol was followed. Aqueous solutions (melts) containing 7% w/w gelatin, 0.25% bis-vinyl sulphonyl methyl ether (gelatin hardener) and surfactant were coated by hand onto 7 inch (17.8 cm) wide polyethylene terephthalate film base using a 0.005 inch (127 μm) undercut stainless steel blade. The film base, which was suitably subbed to provide good adhesion of the coatings, was held by vacuum to a flat stainless steel table thermostatted at about 17° C. The melts were held at 40° C. prior to coating. After coating, the thin layers chill set rapidly and the coatings were then hung to dry overnight under ambient conditions in a room conditioned with filtered air.

Table 6 shows the charging characteristics ($\mu$C.m$^{-2}$) of a range of coatings containing a selection of coating aids from the invention, measured against stainless steel by the impact charge test under the standard conditions.

TABLE 6

Impact charging values against stainless steel at 21° C. and 50% RH

| Coating Aid (Invention) | Concentration of Coating Aid 0.3 wt % | Impact Charging Values ($\mu$C.m$^{-2}$) against Stainless Steel at 21° C. and 50% RH Structure |
|---|---|---|
| I-1 | −70 | $C_6F_{13}CH_2CH_2S[A]_5H$ |
| I-2 | −54 | $C_8F_{17}CH_2CH_2S[A]_{13}H$ |
| I-4 | −40 | $C_8F_{17}CH_2CH_2S[A]_7H$ |
| I-6 | +57 | $C_{12}H_{25}S[A]_{10}H$ |
| I-12 | −25 | $C_6F_{13}CH_2CH_2S[X]_{10}H$ |
| I-17 | −53 | $C_6F_{13}CH_2CH_2S[Oh]_5H$ |
| I-18 | −48 | $C_8F_{17}CH_2CH_2S[Oh]_7H$ |
| I-23 | +32 | $C_{12}H_{25}S[X]_{10}H$ |
| I-24 | +44 (1 wt %) | $C_{16}H_{33}S[Oh]_{15}H$ |

Table 6 compares the charging characteristics of fluorocarbon tail oligomers with hydrocarbon tail oligomers for three different oligomeric types, i.e. based on A, X and Oh monomers (see Table A hereinbefore). In all three cases, the hydrocarbon tail oligomers cause the coatings to charge positively and the fluorocarbon tail oligomers cause the coatings to charge negatively. Hence in principle, mixtures of these hydrocarbon and fluorocarbon surface active materials can be used to reduce the propensity of a coating to charge electrostatically by balancing out each other's positive and negative charging characteristics, a technique in common use in the art with conventional coating aids.

It will, of course, be understood that the present invention has been described above purely by way of example and that modifications of detail can be made within the scope of the invention.

What is claimed is:

1. A coating composition that comprises a liquid medium that contains a hydrophilic colloid and a surfactant, characterised in that the surfactant is a hydrophobically capped oligomeric acrylamide or pyrrolidone.

2. A composition according to claim 1, in which the surfactant is a compound of the general formula

(1)

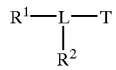

(2)

in which

R, $R^1$ and $R^2$ are each independently selected from aliphatic hydrocarbyl, aryl-(aliphatic hydrocarbyl) and (aliphatic hydrocarbyl)-aryl groups, which groups may be unsubstituted, partially fluorinated or fully fluorinated, L is a sulphur atom or a linking group that contains a sulphur atom attached to the T group and T is a hydrophilic oligomeric group obtainable by the oligomerisation of one or more vinyl monomers having an amido function.

3. A composition according to claim 2 in which the surfactant is a compound of the general formula

R—S—T (3)

R—O—OC—CH$_2$—S—T (4)

R—NH—OC—CH$_2$—S—T (5)

(6)

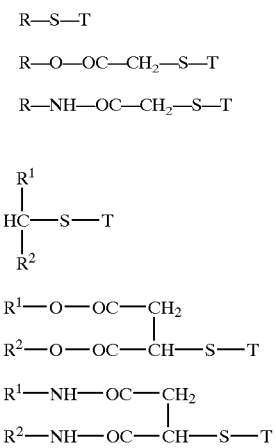

(7)

(8)

4. A composition according to claim 2 in which R, R$^1$ and R$^2$ are each independently selected from alkyl, alkenyl, phenyl-alkyl, phenyl-alkenyl, naphthylalkyl, naphthylalkenyl, alkylphenyl, alkenylphenyl, alkylnaphthyl and alkenylnaphthyl groups, which groups may be unsubstituted, partially fluorinated or fully fluorinated.

5. A composition according to claim 2 in which each of R, R$^1$ and R$^2$ contains from 8 to 21 carbon atoms.

6. A composition according to claim 2, in which T is obtainable by the oligomerisation of a monomer of the general formula

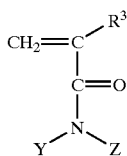
(9)

in which R$^3$ is H or C$_1$–C$_3$ alkyl,

Y is H, C$_1$–C$_3$ alkyl or C$_1$–C$_4$ alkyl substituted with one or more hydroxyl groups, and Z, which may be the same as or different from Y, is H, C$_1$–C$_3$ alkyl or C$_1$–C$_4$ alkyl substituted with one or more hydroxyl groups, or Y and Z, together with the adjacent N atom, form a heterocyclic ring, or of the formula

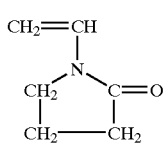
(10)

7. A composition according to claim 6 in which

R$^3$ is H or CH$_3$,

Y is H, CH$_3$, C$_2$H$_5$ or C(CH$_2$OH)$_3$, and

Z, which may be the same as or different from Y, is H, CH$_3$, C$_2$H$_5$ or C(CH$_2$OH)$_3$.

8. A composition according to claim 2 which contains at least one compound in which R or R$^1$ and R$^2$ is/are fluorinated and at least one compound in which R or R$^1$ and R$^2$ is/are unsubstituted.

9. A composition according to claim 1, in which the oligomeric group contains from 2 to 100 monomeric units.

10. A composition according to claim 9, in which the oligomeric group contains from 3 to 50 monomeric units.

11. A composition according to claim 1, in which the surfactant is any of the compounds hereinbefore described in Table A.

12. A composition according to claim 1 in which the liquid medium is an aqueous medium.

13. A composition according claim 1, in which the hydrophilic colloid is gelatin.

14. A composition according to claim 1 which also contains saponin.

15. A photographic material comprising a support and at least one hydrophilic colloid layer and including at least one light-sensitive silver halide emulsion layer, wherein at least one hydrophilic colloid layer comprises a surfactant compound which is a hydrophobically capped oligomeric acrylamide or pyrrolidone.

16. A photographic material according to claim 15, in which the surfactant is a compound of the general formula

in which

R, R$^1$ and R$^2$ are each independently selected from aliphatic hydrocarbyl, aryl-(aliphatic hydrocarbyl) and (aliphatic hydrocarbyl)-aryl groups, which groups may be unsubstituted, partially fluorinated or fully fluorinated, L is a sulphur atom or a linking group that contains a sulphur atom attached to the T group and T is a hydrophilic oligomeric group obtainable by the oligomerisation of one or more vinyl monomers having an amido function.

17. A photographic material according to claim 16 in which the surfactant is a compound of the general formula

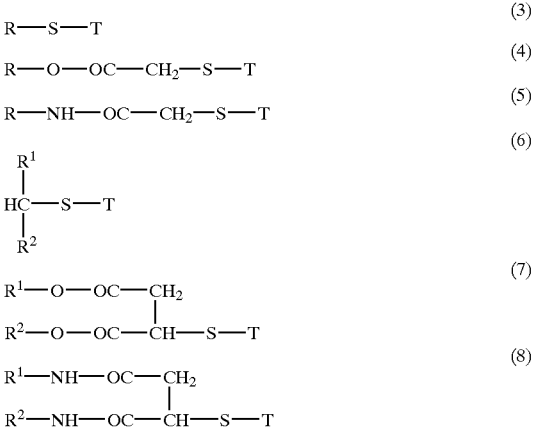

18. A photographic material according to claim 16 in which R, R$^1$ and R$^2$ are each independently selected from alkyl, alkenyl, phenyl-alkyl, phenyl-alkenyl, naphthylalkyl, naphthylalkenyl, alkylphenyl, alkenylphenyl, alkylnaphthyl and alkenylnaphthyl groups, which groups may be unsubstituted, partially fluorinated or fully fluorinated.

19. A photographic material according to claim 16 in which each of R, $R^1$ and $R^2$ contains from 8 to 21 carbon atoms.

20. A photographic material according to claim 16, in which T is obtainable by the oligomerisation of a monomer of the general formula

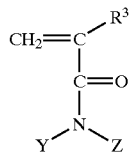
(9)

in which $R^3$ is H or $C_1$–$C_3$ alkyl,
Y is H, $C_1$–$C_3$ alkyl or $C_1$–$C_4$ alkyl substituted with one or more hydroxyl groups, and
Z, which may be the same as or different from Y, is H, $C_1$–$C_3$ alkyl or $C_1$–$C_4$ alkyl substituted with one or more hydroxyl groups, or
Y and Z, together with the adjacent N atom, form a heterocyclic ring,
or of the formula

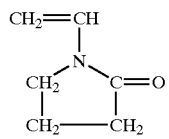
(10)

21. A photographic material according to claim 20 in which
$R^3$ is H or $CH_3$,
Y is H, $CH_3$, $C_2H_5$ or $C(CH_2OH)_3$, and
Z, which may be the same as or different from Y, is H, $CH_3$, $C_2H_5$ or $C(CH_2OH)_3$.

22. A photographic material according to claim 16 which contains at least one compound in which R or $R^1$ and $R^2$ is/are fluorinated and at least one compound in which R or $R^1$ and $R^2$ is/are unsubstituted.

23. A photographic material according to claim 15, in which the oligomeric group contains from 2 to 100 monomeric units.

24. A photographic material according to claim 23, in which the oligomeric group contains from 3 to 50 monomeric units.

25. A compound of the general formula

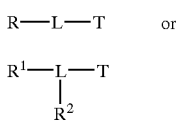

in which
R, $R^1$ and $R^2$ are each independently selected from aliphatic hydrocarbyl, aryl-(aliphatic hydrocarbyl) and (aliphatic hydrocarbyl)-aryl groups, which groups may be unsubstituted, partially fluorinated or fully fluorinated,
L is a sulphur atom or a linking group that contains a sulphur atom attached to the T group and
T is obtainable by the oligomerisation of a monomer of the general formula

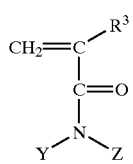
(9)

in which $R^3$ is H or $C_1$–$C_3$ alkyl,
Y is H, $C_1$–$C_3$ alkyl or $C_1$–$C_4$ alkyl substituted with one or more hydroxyl groups, and
Z, which may be the same as or different from Y, is H, $C_1$–$C_3$ alkyl or $C_1$–$C_4$ alkyl substituted with one or more hydroxyl groups, or
Y and Z, together with the adjacent N atom, form a heterocyclic ring,
or of the formula

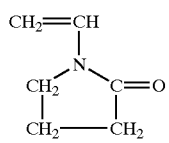
(10)

* * * * *